Dec. 20, 1960     M. PESTEMER ET AL     2,965,578
SHAPED ARTICLES CONTAINING 2.4-DIHYDROXY-BENZOYL FURANE
Filed March 20, 1957
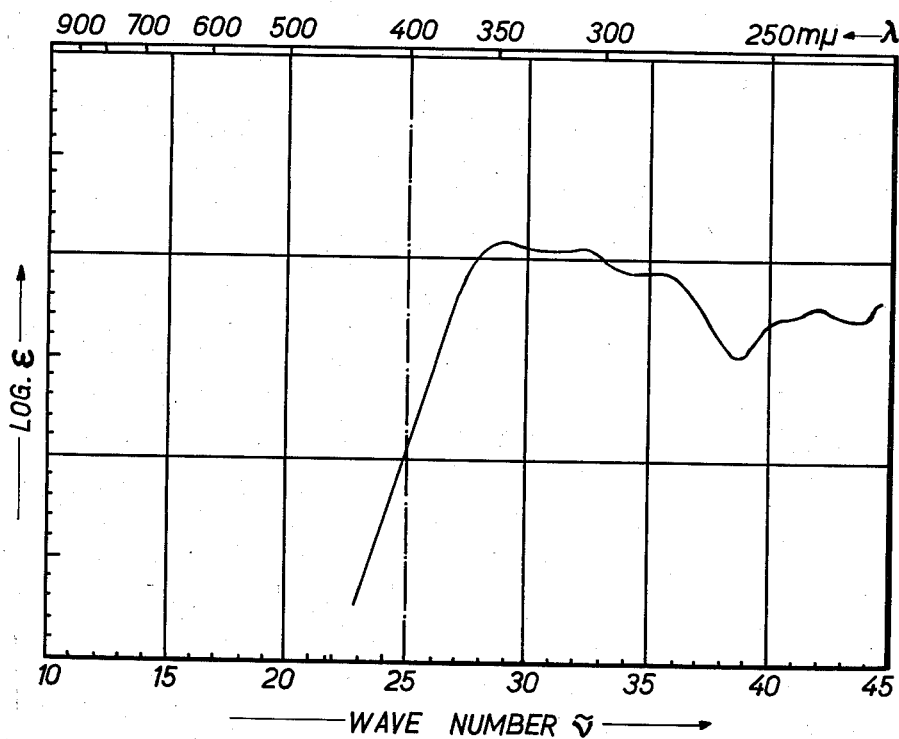
INVENTORS:
MAX PESTEMER, WERNER SIEFKEN, OTTO BAYER.
BY
their ATTORNEYS 2,965,578
Patented Dec. 20, 1960

2,965,578

SHAPED ARTICLES CONTAINING 2.4-DIHYDROXY-BENZOYL FURANE

Max Pestemer, Opladen, Werner Siefken, Leverkusen, and Otto Bayer, Leverkusen-Bayerwerk, Germany, assignors to Farbenfabriken Bayer Aktiengesellschaft, Leverkusen, Germany, a corporation of Germany Filed Mar. 20, 1957, Ser. No. 647,232

Claims priority, application Germany Mar. 31, 1956

4 Claims. (Cl. 252—300)

This invention relates to shaped articles and more particularly to shaped articles which contain an absorbent for ultra-violet light. Such shaped articles are for instance light filters. The purpose of light filters is wholly or partially to screen off light of certain wavelengths. If such light filters are to exclude the ultra-violet range but are to allow the visible range to pass through as far as possible without hindrance, the absorption of the ultra-violet light must start suddenly at a wavelength of approximately 400 m$\mu$ and reach such a high value that an adequate protective effect against light is still available with a low concentration of the substance absorbing ultra-violet or with a small thickness of the filter layers, i.e. that no displacement of the absorption limit is produced.

It has been found that 2.4-dihydroxy-benzoyl furane of the formula

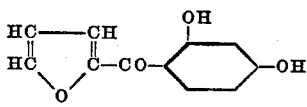

satisfies the conditions to an excellent degree. Practically the entire range of ultra-violet light is absorbed thereby, close up to the limit of visible light.

Colourless materials to which this compound is added remain colourless as such, but are practically impervious to ultra-violet light. Since even under the influence of long exposure in sunlight, this compound is not changed chemically and discoloured, not only is the material into which it is incorporated protected for a long time against the effect of ultra-violet rays, but also the material disposed underneath this material is protected from the damaging influence of light which contains ultra-violet portions before passing through the material. Owing to these advantageous properties, the compound is suitable for a wide range of different purposes, such for example as a protective means for cotton or other natural products such as gelatine, and also for coatings, films, foils, threads, fibres, molded articles or other shaped elements consisting of synthetic plastics, for preventing or delaying the bleaching of dyes on textile materials, as an additive to protective and filter layers for light sensitive photographic films and papers as well as for photographic images. The compound may furthermore be incorporated into filter screens for display windows and into packing materials for articles which are sensitive to light such as foodstuffs and also into cosmetic bases which are used as a protective agent for the human skin. Suitable synthetic plastics which may be combined with the above compound are for instance cellulose ester and cellulose ethers, polymethacrylates, alkyd resins, mixtures of ethylenically unsaturated polyesters, such as maleic acid-glycol polyesters, and ethylenically unsaturated monomers, such as styrene, dialkyl phthalate, which mixtures are transformed under polymerizing conditions into molded articles or coatings, polyvinylalcohol, polyethylene, polyacrylonitriles, polyamides (nylons), polyesters of terephthalic acid and glycols, polycarbonates, carboxymethylcellulose, hydroxymethylcellulose, urea-formaldehyde resins, melamine-formaldehyde resins.

The present invention is furthermore applicable to cellulosic material such as paper (including parchment paper), regenerated cellulose (cellophane), wood pulp in the course of its manufacture into paper. The amount of the compound is preferably adjusted to 0.05–2 percent based on the weight of the base or sheet material.

In the accompanying drawing there is illustrated a spectrophotometric curve of a methanol solution of 2.4-dihydroxy-benzoyl furane.

*Example 1*

1 part by weight of 2.4-dihydroxy-benzoyl furane and 99 parts by weight of cellulose acetate are dissolved in an organic solvent such as acetone. After the solution has been cast and after the solvent has evaporated, there is obtained a colourless, water-insoluble film which provides protection against ultra-violet rays and does not turn yellow in sunlight. Other film-forming agents, for example nitro-cellulose, can be used instead of cellulose-acetate.

*Example 2*

Undyed, bleached or dyed cotton is treated for half an hour at 40–50° C. in an after treatment bath with a bath liquid containing 3 grams of 2.4-dihydroxy benzoyl furane and 4 grams of sodium carbonate per litre, whereafter the cotton is wrung out and dried. The light-fastness of the material is clearly improved by this treatment.

*Example 3*

A paper pulp prepared in the usual manner has 1% (based on the dry substance) of the sodium salt of 2.4-dihydroxy-benzoyl furane added thereto during the processing and the paper obtained from this pulp is converted into parchment paper by treatment with 60° Bé. sulphuric acid for a period of 15–20 seconds. The paper is practically impervious to ultra-violet light and can be used with advantage for packing light sensitive materials, especially foodstuffs.

We claim:

1. A shaped article substantially impervious to ultra-violet radiation, consisting essentially of an organic film-forming plastic which is normally pervious to ultra-violet radiation, and 0.05–2% by weight of $\alpha$-(2'.4'-dihydroxy-benzoyl)-furane homogeneously incorporated therein.

2. A sheet material which is substantially impervious to ultra-violet radiation, consisting essentially of an organic plastic film having a composition which is normally pervious to ultra-violet radiation, said film having homogeneously incorporated therein 0.05–2% by weight of $\alpha$-(2'.4'-dihydroxy-benzoyl)-furane.

3. A transparent organic plastic film having homogeneously incorporated therein 0.05–2% by weight of $\alpha$-(2'.4'-dihydroxy-benzoyl)-furane, said film permitting light of visible wave length to pass through but filtering out substantially all ultra-violet light.

4. The article of claim 3, wherein the film is cellulosic and is a member of the group consisting of regenerated cellulose, cellulose acetate, and nitrocellulose.

References Cited in the file of this patent

UNITED STATES PATENTS 2,043,805   Murray _____ June 9, 1936
2,069,803   Heckert _____ Feb. 9, 1937

OTHER REFERENCES

Gilman: "Insecticidal Action of Furane Comp'd.," Iowa State College, J. Sci. vol. (1933), Dept. of Agriculture, pp. 419–428.